US011948043B2

(12) United States Patent
Kurz et al.

(10) Patent No.: US 11,948,043 B2
(45) Date of Patent: Apr. 2, 2024

(54) TRANSPARENT INSERT IDENTIFICATION

(71) Applicant: Apple Inc., Cupertino, CA (US)

(72) Inventors: Daniel Kurz, Hilo, HI (US); Anselm Grundhoefer, Campbell, CA (US); Tushar Gupta, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/824,339

(22) Filed: May 25, 2022

(65) Prior Publication Data

US 2022/0391608 A1 Dec. 8, 2022

Related U.S. Application Data

(60) Provisional application No. 63/195,748, filed on Jun. 2, 2021.

(51) Int. Cl.

| | |
|---|---|
| ***G06K 7/14*** | (2006.01) |
| ***G02B 27/01*** | (2006.01) |
| ***G06T 7/70*** | (2017.01) |
| ***G06V 40/18*** | (2022.01) |

(52) U.S. Cl.

CPC ....... *G06K 7/1404* (2013.01); *G02B 27/0101* (2013.01); *G06T 7/70* (2017.01); *G06V 40/18* (2022.01); *G02B 2027/0138* (2013.01); *G02B 2027/014* (2013.01); *G02B 27/0179* (2013.01); *G06T 2207/10016* (2013.01); *G06T 2207/30201* (2013.01)

(58) Field of Classification Search

CPC .. G02B 27/017; G02B 27/01; G02B 27/0172; G02B 27/0179; G06K 7/1404; G06K 7/10396; G06F 3/013

See application file for complete search history.

(56) References Cited

U.S. PATENT DOCUMENTS

| | | | | |
|---|---|---|---|---|
| 8,430,310 | B1 * | 4/2013 | Ho | G06F 21/35 235/382 |
| 9,454,251 | B1 * | 9/2016 | Guihot | G08C 17/02 |
| 9,507,974 | B1 * | 11/2016 | Todeschini | B60W 40/09 |
| 9,536,355 | B1 * | 1/2017 | Kumar | G01J 5/00 |
| 10,409,076 | B2 * | 9/2019 | Tremblay | G02B 27/0179 |
| 10,437,071 | B2 * | 10/2019 | Tremblay | G06F 3/013 |
| 11,025,892 | B1 * | 6/2021 | Aman | H04N 21/458 |

(Continued)

*Primary Examiner* — Daniel I Walsh

(74) *Attorney, Agent, or Firm* — Thompson Hine LLP

(57) ABSTRACT

Various implementations disclosed herein include devices, systems, and methods that use a marking on a transparent surface (e.g., a prescription lens insert for an HMD) to identify information (e.g., prescription parameters) about the transparent surface. In some implementations, the markings do not interfere with eye tracking through the transparent surface or using the transparent surface to view virtual content or a physical environment. In some implementations, image data is obtained from an image sensor of an electronic device, the image data corresponding to a transparent surface attached to the electronic device. Then, a code is identified in the image data, wherein the code is detectable on the transparent surface by the image sensor without interfering with a function of the electronic device involving the transparent surface. In some implementations, content is provided at the electronic device based on the identified code, wherein the content is viewable through the transparent surface.

20 Claims, 8 Drawing Sheets

(56) References Cited

U.S. PATENT DOCUMENTS 11,445,166 B2* 9/2022 Nemoto .................. G09G 5/00
2004/0217173 A1* 11/2004 Lizotte .................... F41A 21/12 235/462.01
2006/0176167 A1* 8/2006 Dohrmann ........... G08B 25/007 340/506
2008/0128492 A1* 6/2008 Roth .................... G06Q 30/018 235/380
2009/0166427 A1* 7/2009 Chambers .......... G06K 7/10792 235/487
2009/0212109 A1* 8/2009 Harttig ................ G06K 7/1417 235/494
2010/0301119 A1* 12/2010 Maeda ...................... B07C 3/14 235/462.01
2011/0157203 A1* 6/2011 Tsai ...................... G06F 3/1423 345/581
2012/0013580 A1* 1/2012 Lin ........................ G09G 3/344 345/204
2012/0019645 A1* 1/2012 Maltz ................... G02B 27/017 348/78
2012/0068976 A1* 3/2012 Chang .................. G06F 3/1423 345/204
2012/0262451 A1* 10/2012 Kotani ................. H04N 13/341 359/466
2014/0263612 A1* 9/2014 Warren ............. H04M 1/72409 235/375
2014/0282646 A1* 9/2014 McCoy ............ H04N 21/44218 725/12
2015/0212316 A1* 7/2015 Krishnan ............... G02B 1/005 977/932
2016/0033772 A1* 2/2016 Han ..................... H04N 1/6083 359/630
2016/0353988 A1* 12/2016 Moller .................. A61B 3/113
2017/0031435 A1* 2/2017 Raffle .................. G02B 27/017
2017/0132806 A1* 5/2017 Balachandreswaran .................... G06T 7/55
2017/0300926 A1* 10/2017 Stout .................... G06Q 10/087
2017/0358256 A1* 12/2017 Ross .................... G09G 3/3611
2018/0053050 A1* 2/2018 Kingsbury ............. G06V 20/95
2018/0157043 A1* 6/2018 Yi ........................ H04N 13/344
2019/0041644 A1* 2/2019 Abele ................ G02B 27/0172
2019/0250408 A1* 8/2019 Lafon .................... A61B 3/113
2019/0258442 A1* 8/2019 Hudman ............ G02B 27/0176
2020/0033560 A1* 1/2020 Weber ....................... G02B 7/14
2020/0050824 A1* 2/2020 Held .................... G06V 10/764
2020/0096775 A1* 3/2020 Franklin ................. G06F 3/012
2020/0174284 A1* 6/2020 Chan ...................... G02B 7/023
2020/0400948 A1* 12/2020 Maric .................. G02B 27/017
2021/0053160 A1* 2/2021 Qiao .................. B23K 26/3576
2021/0128408 A1* 5/2021 Sohr ..................... A61J 1/1468
2021/0169417 A1* 6/2021 Burton ................. A61B 5/4857
2021/0302745 A1* 9/2021 Mutlu ................ G02B 27/0172
2022/0318551 A1* 10/2022 St. Amant .......... G02B 27/0172
2022/0391608 A1* 12/2022 Kurz ...................... G06V 40/19
2023/0031613 A1* 2/2023 Fleury .................. A61B 5/6803
2023/0094600 A1* 3/2023 Liu ..................... H04M 1/0266 455/566
2023/0218159 A1* 7/2023 Eadie ................... A61B 3/0091 600/558
2023/0264442 A1* 8/2023 Mirabella ........ B29D 11/00961
2024/0000312 A1* 1/2024 Bazin ..................... A61B 3/113
2024/0020371 A1* 1/2024 Dedonato ........... G06F 3/04842
2024/0028110 A1* 1/2024 Aurongzeb ............. G06F 3/016
2024/0028114 A1* 1/2024 Cockram ................. G01K 3/10
2024/0031551 A1* 1/2024 Mori ....................... G06F 3/013
2024/0036327 A1* 2/2024 Nishibe ................ H04N 13/344

* cited by examiner

TRANSPARENT INSERT IDENTIFICATION

CROSS-REFERENCE TO RELATED APPLICATIONS

This application claims the benefit of U.S. Provisional Application Ser. No. 63/195,748 filed Jun. 2, 2021, which is incorporated herein in its entirety.

TECHNICAL FIELD

The present disclosure generally relates to electronic devices such as head-mounted devices (HMDs) that may be used with attachable lenses.

BACKGROUND

People sometimes need prescription eyeglasses to see clearly, but wearing them in HMDs may be uncomfortable.

SUMMARY

Various implementations disclosed herein include devices, systems, and methods that use machine readable markings on a transparent surface to identify information about the transparent surface. For example, the transparent surface may be a prescription lens insert for an HMD and the information may be prescription parameters of the prescription lens insert. In some instances, clip-on prescription lenses are attached to the HMD (e.g., between a display in the HMD and the user's eyes), but to operate correctly, the HMD needs to know which prescription lenses are currently attached. In some implementations, the markings are configured to not interfere with "normal" use of the transparent surface, e.g., a user looking through the transparent surface or eye tracking during use of the transparent surface. In some implementations, markings on the transparent surface are not visible to the user of the HMD. In some implementations the markings on the transparent surface are generally visible to an eye tracking image sensor and/or become visible to the eye tracking image sensor only at selective times.

Various implementations disclosed herein include devices, systems, and methods that provide machine readable markings on attachable corrective lenses to identify which specific corrective lens or lenses are attached to an HMD. For example, the right and left corrective lenses may have different prescriptions and based on the markings, the HMD can determine and/or notify the user if the right and left corrective lenses are reversed. In another example, multiple users of the HMD may have their own corrective lenses and based on the markings, the HMD can determine and/or notify the user if the incorrect prescriptive lenses are attached. In addition, the markings on the corrective lenses may be used to ensure that the corrective lenses are attached to the HMD in the correct position and orientation. Further, the markings on the corrective lenses may be used to identify that the user is colorblind or a specific type of colorblindness, which allows corrective processing (e.g., increase contrast or modify selective colors) by the HMD.

In general, one innovative aspect of the subject matter described in this specification can be embodied in methods that include the actions of obtaining image data from an image sensor of an electronic device, the image data corresponding to a transparent surface attached to the electronic device. In some implementations, a code is identified in the image data, wherein the code is detectable on the transparent surface by the image sensor without interfering with a function of the electronic device involving the transparent surface. Then, content is provided at the device based on the identified code, wherein the content is viewable through the transparent surface.

In general, one innovative aspect of the subject matter described in this specification can be embodied in systems that include an image sensor configured to obtain image data corresponding to a transparent surface attached to an electronic device. In some implementations, a display is configured to present content at the electronic device for viewing through the transparent surface, the transparent surface includes a depiction of a code, wherein the code is detectable on the transparent surface by the image sensor without interfering with viewing the display through the transparent surface. Further, a processor is configured to provide content on the display based on the code.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
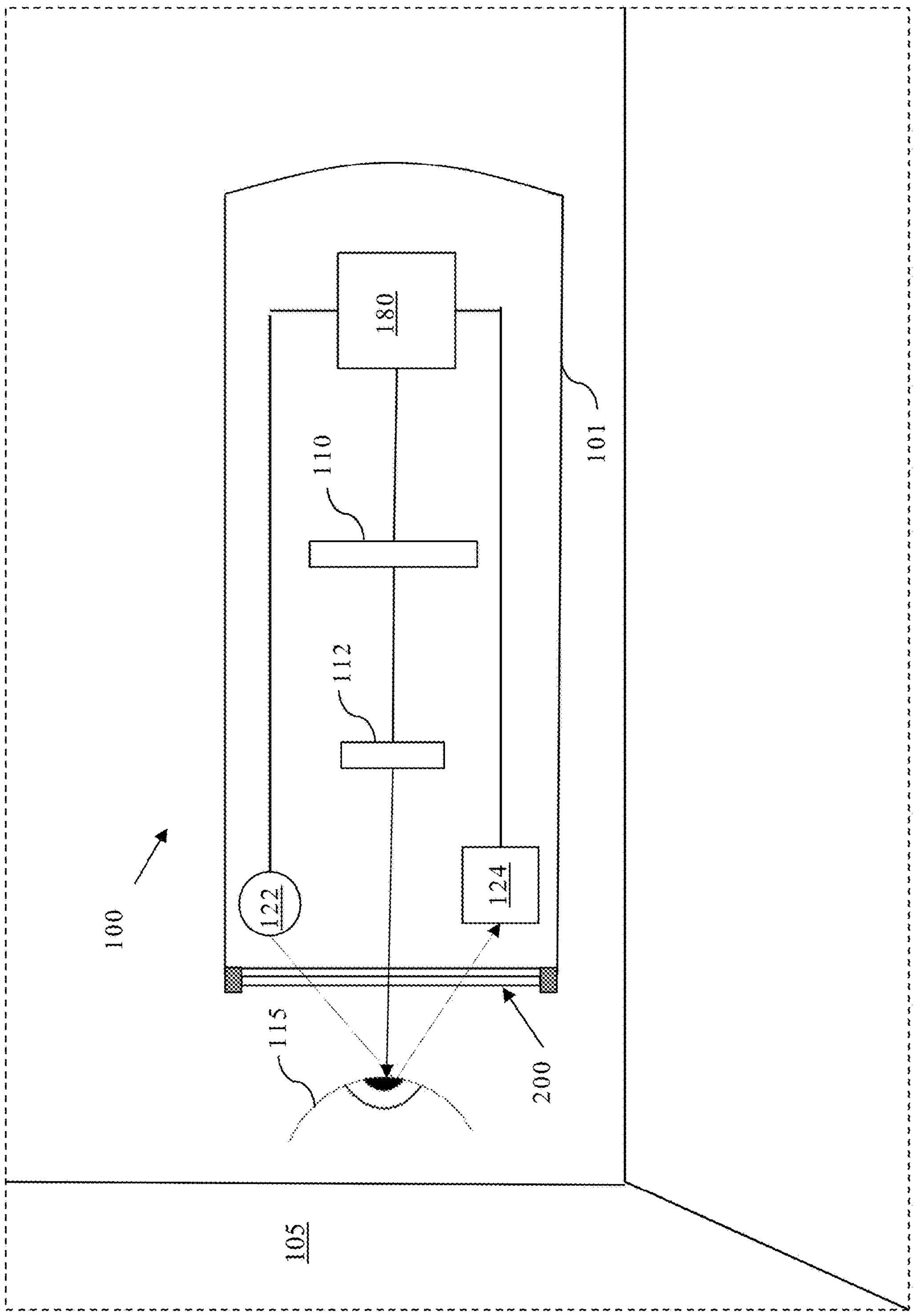
FIG. 1 illustrates a diagram of an exemplary electronic device in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that provide machine readable markings using a transparent surface (e.g., a prescription lens insert for an HMD) to identify information (e.g., prescription parameters) about the transparent surface. In some implementations, the transparent surface is attached to an electronic device. The transparent surface will be used for both visual observation by a user of the electronic device and sensing of the machine readable markings. In some implementations, the machine readable markings are not perceivable (e.g., visible) to the user) when observing/sensing a physical environment or virtual content through the transparent surface.

In some implementations, machine readable markings embed data in corrective lenses (e.g., clip-on prescription lenses) used for HMDs. For example, the markings store decodable information related to the corrective lenses (e.g., prescription, calibration, metadata, etc.) that can be sensed by eye tracking image sensors observing the eyes of an HMD user through the corrective lenses attached to the HMD. In some implementations, the markings and eye tracking information (e.g., glint) are detected in different portions of images obtained by the eye tracking image sensors.

FIG. 1 illustrates a diagram of an exemplary electronic device in accordance with some implementations. In some implementations, an electronic device 100 includes an eye tracking system for detecting eye position and eye movements. In some implementations, images captured by the eye tracking system may be analyzed to detect position and movements of the eyes of a user 115, or to detect a gaze direction of one or both eyes. In some implementations, the eye tracking system may detect other information about the eyes such as blinking (e.g., rate or duration), pupil dilation, or saccadic movements. Moreover, the point of gaze estimated from the eye tracking images may enable gaze-based interaction with content shown on the near-eye display of the electronic device 100.

As shown in FIG. 1, HMD 100 includes a housing 101 (or enclosure) that houses various components of the HMD 100. In some implementations, the housing 101 keeps the HMD 100 in the proper position on the face of the user 115 (e.g., surrounding the eyes of the user 115).

The housing 101 houses a display 110 that displays an image, emitting light towards or onto the eye of the user 115. In various implementations, the display 110 emits the light through an eyepiece having one or more lenses 112 that refracts the light emitted by the display 110, making the display appear to the user 115 to be at a virtual distance farther than the actual distance from the eye to the display 110. For the user 115 to be able to focus on the display 110, in various implementations, the virtual distance is at least greater than a minimum focal distance of the eye (e.g., 7 cm). Further, in order to provide a better user experience, in various implementations, the virtual distance is greater than 1 meter.

The housing 101 also houses a tracking system including one or more illumination/light sources 122, image sensor 124, and a controller 180. The one or more light sources 122 emit light onto the eye of the user 115 that reflects as a light pattern (e.g., one or more glints such as a circle) that can be detected by the image sensor 124 (e.g., camera). Based on the light pattern, the controller 180 can determine an eye tracking characteristic of the user 115. For example, the controller 180 can determine a gaze direction of one or both eyes of the user 115. In another example, the controller 180 can determine a blinking state (eyes open or eyes closed) of the user 115. As yet another example, the controller 180 can determine saccadic movements, a pupil center, a pupil size, or a point of regard. Thus, in various implementations, the light is emitted by the one or more light sources 122, reflects off the eye of the user 115, and is detected by the image sensor 124. In some implementations, the light from the eye of the user 115 is reflected off a mirror or passed through optics such as lenses or an eyepiece before reaching the image sensor 124.

In some implementations, the display 110 emits light in a first wavelength range and the one or more light sources 122 emit light in a second wavelength range. Similarly, the image sensor 124 detects light in the second wavelength range. In some implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm). In some implementations, the light source 122 and the image sensor 124 use overlapping wavelengths when illuminating the eye for eye/gaze tracking. Alternatively, the light source 122 and the image sensor 124 use the same spectrum to illuminate the eye for eye/gaze tracking, while the user 115 is looking through the corrective lenses onto the display 110 showing content using the visible spectrum.

As shown in FIG. 1, corrective lenses 200 can be attached to the HMD 100. In some implementations, the corrective lenses 200 are attached using the housing 101 of the HMD 100. The corrective lenses 200 can help the user 115 to accurately see objects in the physical environment 105. Further, the corrective lenses 200 can help the user 115 to accurately see information using the display 110. However, for the HMD 100 to accurately provide content using image sensor 124 for the user 115, the HMD 100 needs to know the prescription (or other information) about the corrective lenses 200. One way for the HMD 100 to access information about the one or more attached corrective lenses 200 is to incorporate markings in or on the corrective lenses 200. In some implementations, machine readable markings on corrective lenses 200 are detected using a sensor in the HMD 100 such as the image sensor 124. For example, the markings on the corrective lenses can be captured by the image sensor 124 and the information contained therein can be decoded by the controller 180 and used to modify operations (e.g., based on the clip-on corrective lenses prescription parameters) of the HMD 100. In some implementations, markings on the corrective lenses 200 are not visible to the user 115. In some implementations, the markings on the corrective lenses 150 are generally not visible to the image sensor 124 but become visible to the image sensor 124 only at selective times. In some implementations, machine readable markings used to embed data in corrective lenses 200 include materials that are not detectable (e.g., transparent) in a first state and that provide a detectable pattern in a second state to form temporarily visible/detectable markings.

Figure 2:
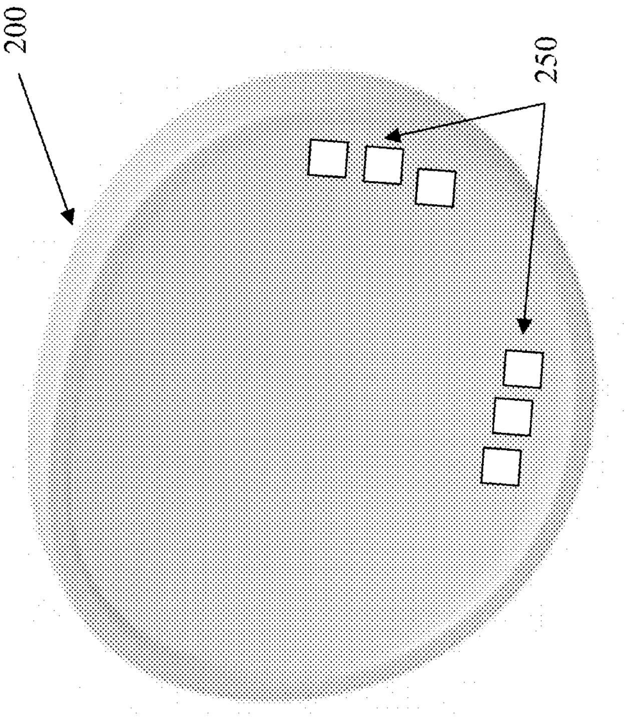
FIG. 2 is a diagram that shows exemplary markings provided by corrective lenses in accordance with some implementations.

FIG. 2 is a diagram that shows an example corrective lens 200 including a machine readable marking in accordance with some implementations. As shown in FIG. 2, machine readable markings 250 (enlarged to be visible) are provided at a peripheral area of the corrective lens 200. In some implementations, a size of the markings 250 is below what can be detected by the unaided human eye. Alternatively, a contrast or spatial frequency of the markings 250 in the corrective lens 200 is not perceivable to the unaided human eye. In some implementations, the markings 250 are formed using a subtractive process (e.g., etched) or formed using an additive process (e.g., painted, deposited) on the corrective lens 200. In some implementations, the markings 250 are formed at multiple locations (e.g., for redundancy) on the corrective lens 200. In some implementations, the markings 250 are in or near a surface closest to the HMD 100 (e.g., image sensor 124), and accordingly, further away from the focus of the user 115, for example, covered by a protective coating. Alternatively, the markings 250 can be on an inner layer (e.g., sub-surface) of the corrective lens 200 at the surface closest to the eye, which may be closest to the focal distance of the image sensor 124 (e.g., that is focused on the eye) and further away from the eye's (hyper) focal distance, which is at the distance of the virtual image of the display 110 (e.g. at 1 m distance).

When attached to the HMD 100, the markings 250 are within a field of view (FOV) of a sensor (e.g., image sensor) of the HMD 100. In some implementations, the markings 250 are outside an area of the corrective lens 200 that is used for viewing foveated rendering by the display 110. As shown in FIG. 2, the markings 250 are outside an area of the corrective lens 200 that is used when the user 115 is viewing the display 110 of the HMD 100. The markings 250 are used to encode information that is utilized by the HMD 100. For example, the markings 250 may encode the prescription parameters (e.g., nearsighted, farsighted) of a prescriptive corrective lens 200. Alternatively, the locations of the markings 250 on the corrective lens 200 can be used to determine the pose (e.g., 3D position and 3 orientations) of the corrective lens 200 when attached to the HMD 100.

Figure 3:
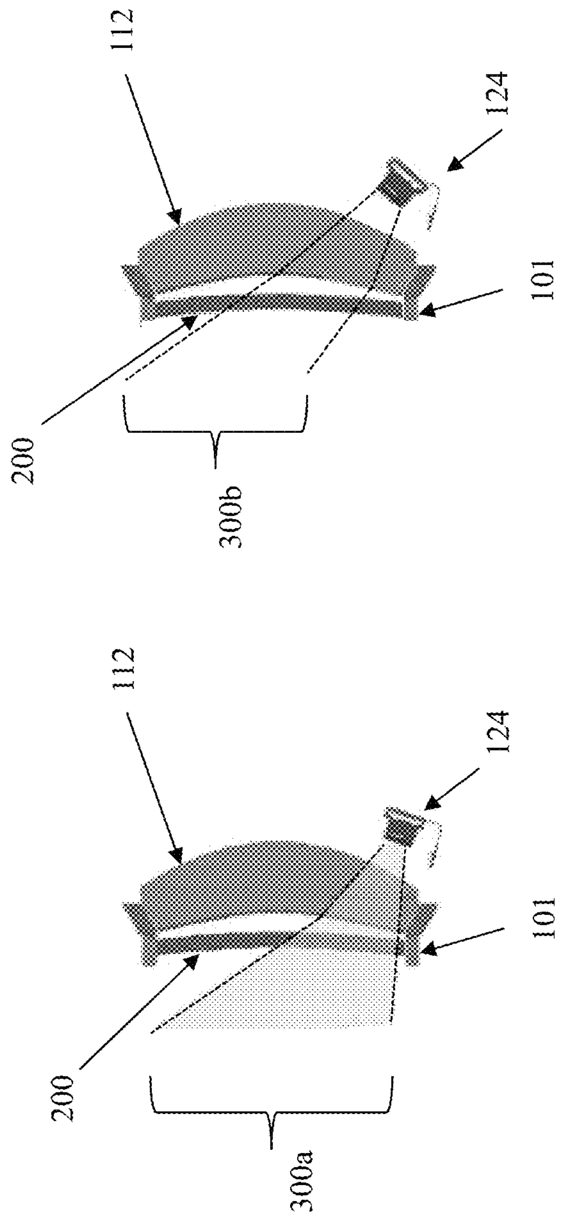
FIG. 3 is a diagram that shows a FOV of an image sensor of the electronic device with respect to attached corrective lenses in accordance with some implementations.

FIG. 3 is a diagram that shows a FOV of an exemplary image sensor of the electronic device with respect to attached corrective lenses in accordance with some implementations. In some implementations, the image sensor 124 has a single FOV (e.g., FOV 300*a*) with respect to the attached corrective lenses 200. For example, the single FOV is used for both eye tracking functionality and detection of the markings on the corrective lenses 200. In other implementations, the image sensor 124 has multiple FOVs with respect to the corrective lenses 200. For example, each different FOV may be used to detect different ones of multiple markings on the corrective lenses 200. In some implementations, the multiple FOVs of the image sensor 124 differ in size, magnification (e.g., zoom-in or zoom-out), orientation (e.g., horizontally, vertically, or both), or combinations thereof. As shown in FIG. 3, the image sensor 124 has a first FOV 300*a* (e.g., to detect markings 250) and a second different FOV 300*b* (e.g., for eye tracking functionality). As described with respect to the image sensor 124, the light source 122 in the HMD 100 may include a plurality of different fields of emission, the HMD 100 may include a plurality of light sources 122 that each have a different field of emission, or combinations thereof. In some implementations, the light source 122 emissions are selectively filtered to modify the spectrum.

In some implementations, machine readable markings used to embed data in corrective lenses 200 include materials that are transparent when not excited and that emit a detectable pattern of light when excited to form the temporarily visible/detectable markings. In some implementations, markings 450 (e.g., 450*a*, 450*b*) include fluorescent materials that have an excitation wavelength/spectrum and an emission wavelength/spectrum. The excitation spectrum and an emission spectrum can be very narrow. In one implementation, the excitation spectrum and the emission spectrum of the markings 450 on the corrective lenses 200 are not visible to the user 115 or the image sensor 124. In another implementation, the excitation spectrum and the emission spectrum of the markings 450 on the corrective lenses 200 are not visible to the user 115 but the emission spectrum of the markings 450 is detectable by the image sensor 124.

Figure 4A:
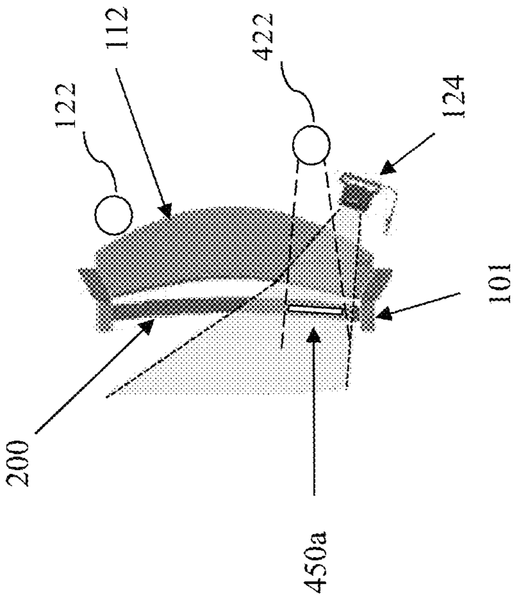
FIGS. 4A-4B illustrate exemplary configurations of an electronic device for markings of corrective lenses that include an excitation spectrum and an emission spectrum in accordance with some implementations.

As shown in FIG. 4A, transparent fluorescent material forming markings 450*a* has an excitation spectrum that does not overlap with the incident illumination (e.g., visible spectrum) that the user 115 sees or the detectable spectrum of the eye tracking image sensor 124. However, the emission spectrum of the markings 450*a* is within the detectable spectrum of the eye tracking image sensor 124. In such implementations, the markings 450*a* can be detected at any time because the markings 450*a* are not visible to the user 115 although an additional illumination source 422 (e.g., excitation illumination) may be added to the HMD 100. In some implementations, the markings 450*a* and the eye tracking information are detected in different portions of images from the image sensor 124. Alternatively, the markings 450*a* and the eye tracking information can at least partially overlap in the images from the image sensor 124. In other implementations, the markings 450*a* can be detected in one or more images taken by the image sensor 124 when the user 115 blinks, looks away, or the eye tracking functionality is not being used by the HMD 100. In one implementation, the markings 450*a* can be detected when eye tracking is enabled and content is displayed (or not displayed) in a specific area of the display 110. Alternatively, the markings 450*a* can be detected when eye tracking is enabled using one or more blank frames (e.g., light source 122 is turned off) synchronized with the image sensor 124. For example, the detectable spectrum of the eye tracking image sensor 124 can be a spectrum around the 850 nm or 950 nm wavelengths. Although FIG. 4A illustrates an implementation where the emission spectrum of the markings 450*a* is within the detectable spectrum of the eye tracking image sensor 124, embodiments are not limited so such implementations.

Figure 4B:
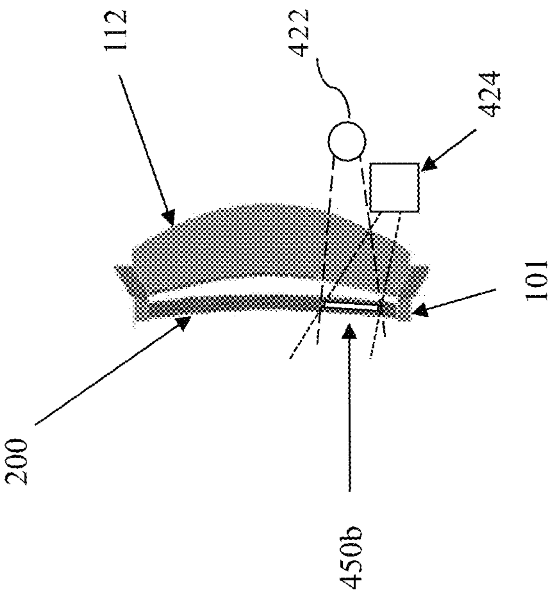

For instance, as shown in FIG. 4B, transparent fluorescent material forming the markings 450*b* can have an excitation spectrum and an emission spectrum that does not overlap with the incident illumination (e.g., visible spectrum) that the user 115 sees or the detectable spectrum of the eye tracking image sensor 124. In such implementations, an additional illumination source 422 (e.g., excitation illumination) and an additional image sensor 424 that can detect the emission spectrum of the markings 450*b* can be added to the HMD 100. Accordingly, the fluorescing markings 450*b* can be detected anytime without interfering with operations of the HMD 100. For example, the illumination source 422 can be a UV spectrum and the image sensor 424 can be a NIR/IR spectrum different from the image sensor 124. In some implementations, when the excitation illumination is UV, the markings 450 are detected when the HMD 100 is not being used (e.g., to avoid exposure to the UV illumination).

In one implementation, the markings 450*a* have an excitation spectrum that is provided by the illumination source 122 and is within a first portion of the detectable spectrum of the image sensor 124 and an emission spectrum of the markings 450*a* is within a second portion of the detectable spectrum of the image sensor 124.

In some implementations, the emission spectrum of the fluorescent materials used for the markings 450 overlaps with the visible spectrum, and the information emitted by the fluorescing markings 450 will be in the visible spectrum of the user 115. In such implementations, additional visible light filters (e.g., notch filters in the corrective lenses 200) between such markings 450 and the eyes of the user 115 may be used to hide emissions from the fluorescing markings 450 that occur within the visible spectrum from the user 115. Alternatively, when the excitation spectrum for the markings 450 overlaps the visible spectrum, the detection occurs when the user 115 looks away or the HMD 100 is not being used (e.g., based on timing).

In some implementations, markings used to embed data in corrective lenses 200 include materials that are initially transparent, but have changeable reflectance properties. In some implementations, machine readable markings 550 (e.g., 550*a*, 550*b*) have an exposure wavelength/spectrum and a detection wavelength/spectrum. In some implementations, markings 550 used to embed data in corrective lenses 200 include reversible photochromic materials that change their reflectance properties over a part of the electromagnetic spectrum (e.g., within the detection spectrum of the detecting image sensor) from transparent to opaque (e.g., detectably darker) when exposed to a higher-energy spectrum/illumination, for example, UV illumination.

Accordingly, when the reversible photochromic materials are exposed to high energy illumination and an external light source is activated within the detection spectrum of the detecting image sensor/camera, the photochromic reaction spatially dims external light transmission through the markings 550 in the corrective lenses to reveal the embedded information. In some implementations, when the photochromic reaction is realized using UV illumination, the markings 550 are detected when the HMD 100 is not being used (e.g., to avoid skin exposure to the UV illumination).

Figure 5B:
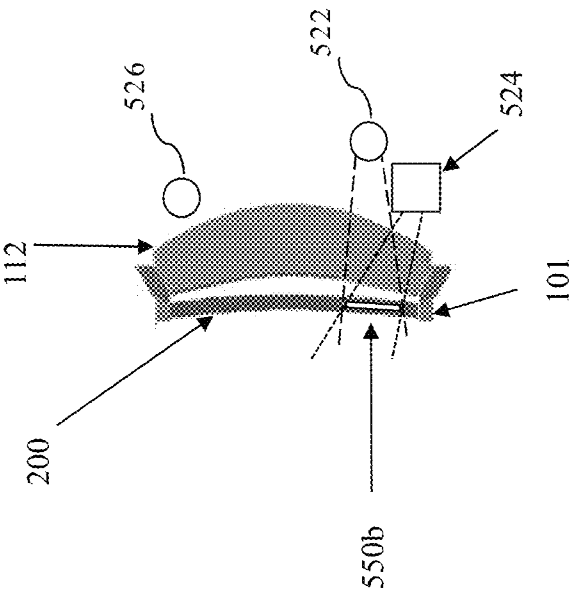
FIGS. 5A-5B illustrate exemplary configurations of an electronic device for markings of corrective lenses that include an exposure spectrum and a detection spectrum in accordance with some implementations.
Figure 5A:
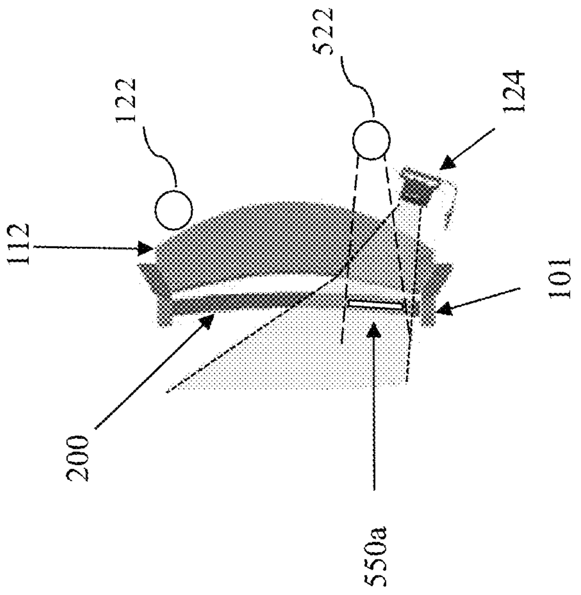

As shown in FIG. 5A, reversible photochromic material forming the markings 550*a* has an exposure spectrum (e.g., outside the visible spectrum, IR, UV illumination) from an exposure illumination source 522 that does not overlap with the incident illumination (e.g., visible spectrum) the user 115 sees or the detectable spectrum of the eye tracking image sensor 124. However, the detection spectrum of the markings 550*a* is within the spectrum of the eye tracking image sensor 124. In such implementations, the markings 550*a* can be detected at any time because the markings 550*a* are not visible to the user 115 although an additional illumination source 522 (e.g., excitation illumination) may be added to the HMD 100. In some implementations, the markings 550*a* and the eye tracking information are detected in different portions of images from the image sensor 124. Alternatively, the exposed markings 550*a* illuminated by the eye tracking light source 122 can be detected by the image sensor 124 when the user 115 looks away, blinks, when the image sensor 124 is not in an active illumination eye tracking situation, or the HMD 100 is not being used. Although FIG. 5A illustrates an implementation where the detection spectrum of the markings 550*a* is within the detectable spectrum of the eye tracking image sensor 124, embodiments are not limited so such implementations.

For instance, as shown in FIG. 5B, markings 550*b* can have an excitation spectrum and a detection spectrum that does not overlap with the incident illumination (e.g., visible spectrum) that the user 115 sees or the detectable spectrum of the eye tracking image sensor 124. Further, the markings 550*b* have a detection light source and sensor that does not overlap with the incident illumination (e.g., visible spectrum) that the user 115 sees or the detectable spectrum of the eye tracking image sensor 124. However, the exposure illumination source 522, and an additional illumination source 526 and image sensor 524 for detecting the exposed markings 550*b* are added to the HMD 100. In such implementations, the reversible photochromic markings 550*b* can be detected anytime without interfering with operations of the HMD 100. For example, the exposure illumination source can be a UV spectrum and the detection light source/image sensor can be a NIR/IR spectrum different from the image sensor 124 or the visible spectrum shielded from the user 115.

In some implementations, machine readable markings used to embed data in corrective lenses include reflection holographic optical elements embedded or attached to the corrective lenses. Thus, holographic markings in the corrective lenses 200 are illuminated by a light source (e.g. a non-coherent LED) and detected by an image sensor in the HMD 100. For example, the light source can be an additional light source placed at a distinct location (e.g., away from the eye tracking light source 122) to reveal and route the holographically stored data (e.g., Denisyuk holography) into the observation direction of the image sensor 124. In such implementations, the holographic markings can be detected at any time because the holographic markings are not visible to the user 115 although an additional illumination source (e.g., holographic illumination) may be added to the HMD 100. In some implementations, the holographic markings and the eye tracking information are detected in different portions of images from the image sensor 124. In one implementation, an additional illumination source (e.g., the holographic illumination source) and an additional image sensor to detect the illuminated holographic markings are added to the HMD 100. In some implementations, the reference beam angle of the illuminated holographic markings is limited (e.g., 15°, 30°, 45°).

In some implementations, machine readable markings used to embed data in corrective lenses 200 include materials that are transparent when not illuminated, but generate a detectable pattern of light on a projection surface when illuminated to form the temporarily visible/detectable markings. In some implementations, caustic markings 650 in the corrective lenses 200 include computational caustic materials that use an illumination and detection wavelength/spectrum.

Figure 6A:
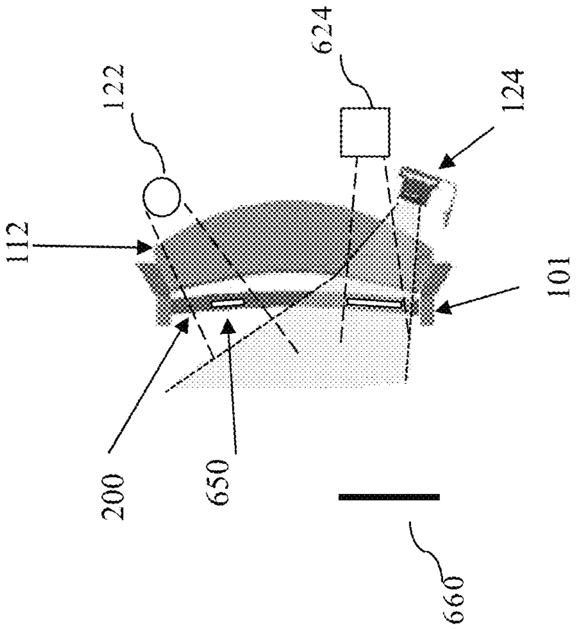
FIGS. 6A-6B illustrate exemplary configurations of an electronic device for markings of corrective lenses that use a projection surface in accordance with some implementations.
Figure 6B:
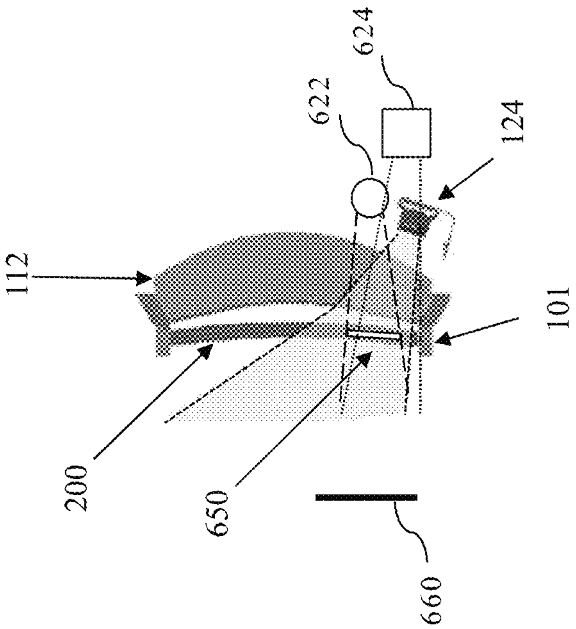

In some implementations, machine readable markings used to embed data in the corrective lenses 200 include computational caustic materials that form a caustic marking 650. In some implementations, information in the caustic markings 650 becomes visible to a caustic marking image sensor when illuminated by a caustic light source (e.g., a specific light source at a specific angle) on a projection surface 660 (e.g., a detection surface that is at a specific distance) spaced apart from the corrective lenses 200 (e.g., the caustic marking 650). As shown in FIG. 6A, the eye tracking light source 122 (e.g., IR LED) illuminates the caustic markings 650 in the corrective lenses 200 and the eye tracking image sensor 124 (or another camera 624) detects the information (e.g., light and dark patterns) visible on the skin surface of the user 115 (e.g., becomes the projection surface 660). Alternatively, as shown in FIG. 6B, an additional caustic light source 622 in the HMD 100 can be used to illuminate the caustic markings 650 so that the projected information is detected on a projection surface 660 by the image sensor 124 or an additional image sensor 624. In such implementations, the projected information from the markings 650 can be detected at any time because the markings 650 are not visible to the user 115. Alternatively, the caustic marking 650 is detected when the HMD 100 is not in use. In this case, the projection surface 660 can be a surface upon which the HMD 100 is placed (e.g., a flat surface such a desk, a table top, or a nearby flat surface such as a vertical surface or wall). Again, the invisible information in the caustic marking 650 is made visible on the projection surface to an image sensor of the HMD 100 when the caustic marking 650 is illuminated by a corresponding illumination source. In some implementations, the caustic marking 650 is relatively small, transparent, and can be located in the peripheral region on the corrective lenses 200. For example, the caustic marking 650 is a polished uneven section of the corrected lenses 200.

In some implementations, machine readable markings in corrective lenses include (1) markings that are always detectable but not perceivable by the human eye (e.g., size or wavelength) such as very small but detectable etchings in the corrective lenses, (2) markings (e.g., fluorescent) that are detectable in an emission spectrum after being illuminated by a different excitation spectrum/illumination, (3) markings (e.g., photochromic) that are detectable in an illumination/detection spectrum after being illuminated by a different exposure spectrum/illumination, (4) markings (e.g., reflection holograms) that are detectable when illuminated in a single illumination/detection spectrum, or (5) markings (e.g., computational caustics) that are detected using a spaced apart projection surface when illuminated in a single illumination/detection spectrum.

In some implementations, the markings in the corrective lenses 200 can include information such as prescription of the lens, curvature of the lens, cylindrical power, spherical power, prism information, etc. In one implementation, per lens calibration data can be included in the markings on the corrective lenses 200. For example, per lens calibration data provides the actual surface profile of the lens (e.g., lens imperfections), which provide additional data and allows the HMD 100 to more accurately adapt to each individual corrective lens. The per lens calibration data can be magnitudes more data than the prescription parameters.

In some implementations, the HMD 100 uses the information in the markings of the corrective lenses 200 to adjust rendering processes for the display 110, for example, to reduce or correct distortion. Further, the HMD 100 uses the information in the markings of the corrective lenses 200 to validate the identity of the specifically attached corrective lenses 200, the user 115, or the spatial positioning of the attached corrective lenses 200. For example, the iris of the user 115 can be used to identify the user 115 and validate the attached corrective lenses 200. In another example, minor displacements (e.g., to the right, left, up, or down) of the spatial positioning of the attached corrective lenses 200 can be identified from the markings in the corrective lenses 200 and corrected using rendering processes of the display 110. Alternatively, a warning to re-attach the corrective lenses can be provided when a large displacement (e.g., over a threshold) of the spatial positioning of the attached corrective lenses 200 is detected.

In some implementations, the markings in the corrective lenses 200 can be detected once (e.g., when the HMD 100 is enabled, during initialization, or placed on the head of the user 115), detected repeatedly (e.g., 1× per second or 1× per minute), detected when eye tracking is not being used, or detected at the point in time when the corrective lenses 200 are mounted to the HMD 100 (e.g., using one or more of a detected vibration, “click”, special orientation, or instruction (e.g., “please detect attached prescription lenses”)). In one implementation, the markings in the corrective lenses 200 are detected when an event (e.g., shock, temperature change, during a single instance or over time) occurs that could have displaced the position of the attached corrective lenses 200. In some implementations, the detection of the markings in the corrective lenses occurs in milliseconds (e.g., 10 ms, 30 ms, etc.). In some implementations, the markings in the corrective lenses 200 that use an additional illumination source are detected when the HMD 100 is not on the head of the user 115.

In some implementations, the markings in the corrective lenses 200 are located on a frame of the corrective lenses 200 or a combination of the frame and the transparent surface of the corrected lenses 200. For example, certain portions of the frame (e.g., interior or exterior) of the corrective lenses 200 are visible to the image sensors of the HMD 100 and therefore can be used for the machine readable markings as variously described herein.

In some implementations, the markings in the corrective lenses 200 are a combination of controlled, active illumination and reactive materials that are transparent in the visual spectrum and an image sensor spectrum when not excited. In some implementations, the image sensor 124 is sensitive to wavelengths within the visible spectrum, but alternately can be sensitive to the NIR, IR, UV spectrum, etc.

In some implementations, the machine readable markings (e.g., markings 250, 450, 550, 650) in the corrective lenses 200 can be generated using an additive process, a subtractive process, or embedded within the surface (e.g., under a protective coating) of the corrective lenses 200. Further, the markings in the corrective lenses 200 can be located only in a portion of the corrective lenses 200 or repeatedly produced at multiple locations in the corrective lenses 200 or frames of the corrective lenses 200.

Various implementations disclosed herein include devices, systems, and methods that provide machine readable markings on attachable corrective lenses to identify which specific corrective lens or lenses are attached to an HMD. For example, the right and left corrective lenses may have different prescriptions and accordingly, the HMD user can be notified if the right and left corrective lenses are reversed. In another example, multiple users of the HMD may have their own corrective lenses and the HMD user can be notified if the incorrect prescriptive lenses are attached. In addition, the markings on the corrective lenses are used to ensure positioning of the corrective lenses attached to the HMD.

In various implementations, the image sensor 124 is a frame/shutter-based camera that, at a particular point in time or multiple points in time at a frame rate, generates an image of the eye of the user 115. Each image includes a matrix of pixel values corresponding to pixels of the image which correspond to locations of a matrix of light sensors of the camera. In implementations, each image is used to measure or track pupil dilation or pupil position by measuring a change of the pixel intensities associated with one or both of a user’s pupils. In various implementations, the image sensor 124 is an event camera comprising a plurality of light sensors (e.g., a matrix of light sensors) at a plurality of respective locations that, in response to a particular light sensor detecting a change in intensity of light, generates an event message indicating a particular location of the particular light sensor.

In some implementations, the HMD 100 uses computer vision techniques and combinations of sensors to track the position of the HMD 100 in the physical environment. In some implementations, Visual Inertial Odometry (VIO) or Simultaneous Localization and Mapping (SLAM) tracks 6 DOF movement of the HMD 100 in the physical environment 105 (e.g., 3 DOF of spatial (xyz) motion (translation), and 3 DOF of angular (pitch/yaw/roll) motion (rotation) in real-time. In some implementations, VIO recalculates or updates the position of the electronic device position in the physical environment 105 in-between every frame refresh on a display of the HMD 100. For example, VIO recalculates the HMD 100 position 10, 30, or 60 or more times a second. In some implementations, VIO tracks the position using a visual sensor (e.g., camera system) by matching a point in the real world to a pixel on the image sensor in each frame, depth sensors, and/or using an inertial system (e.g., accelerometer and gyroscope, inertial measurement unit (IMU), etc.). In some implementations, color images can be used. Alternatively, in some implementations, grayscale images can be used.

Figure 7:
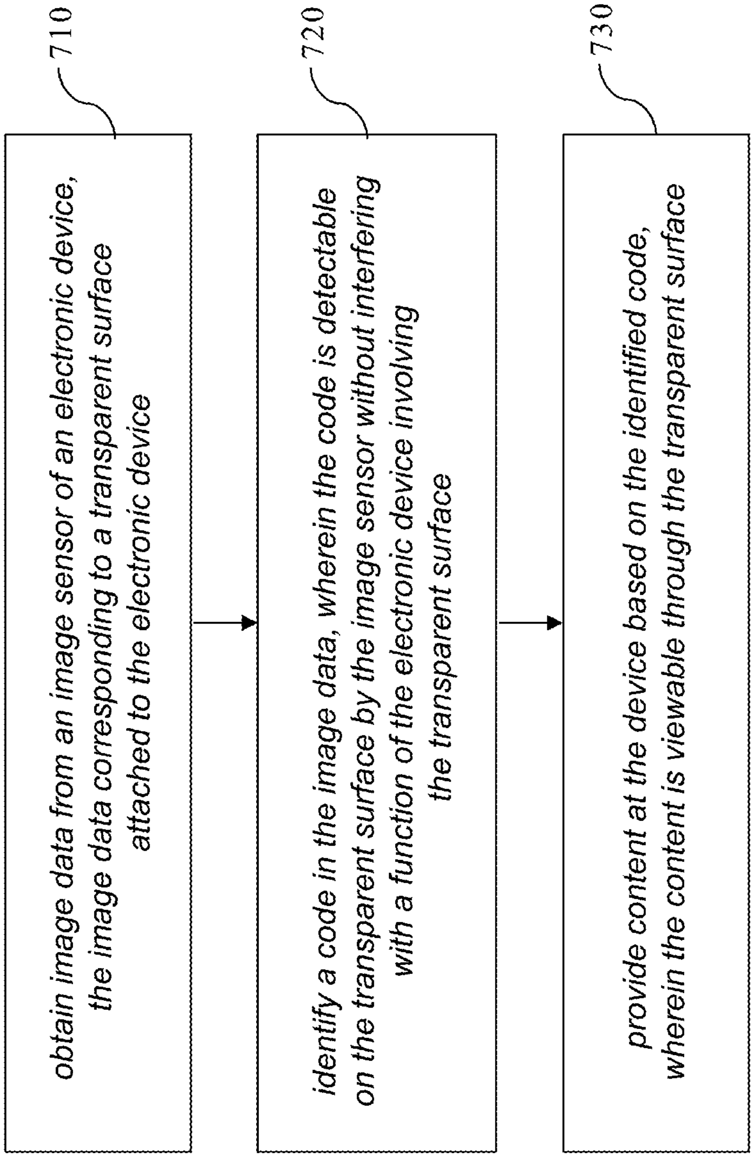
FIG. 7 is a flowchart illustrating an exemplary method of using a marking on a transparent surface to identify information about the transparent surface in accordance with some implementations.

FIG. 7 is a flowchart illustrating an exemplary method of using a marking on a transparent surface to identify information about the transparent surface. For example, the transparent surface may be a prescription lens insert for an HMD and the information may be prescription parameters of the prescription lens insert. In some implementations, the markings are configured not to interfere with "normal" use of the transparent surface, e.g., looking through the transparent surface or eye tracking during use of the transparent surface. In some implementations, the method 700 is performed by a device (e.g., electronic device 800 of FIG. 8). The method 700 can be performed using an electronic device or by multiple devices in communication with one another. In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the method 700 is performed by an electronic device having a processor.

At block 710, the method 700 obtains image data from an image sensor of an electronic device, the image data corresponding to a transparent surface attached to the electronic device. In some implementations, the electronic device is an HMD and the transparent surface is a prescription lens attachment for the HMD. For example, the transparent surface may be an insertable prescription lens, a removable prescription lens, a clip-on prescription lens, or the like. In some implementations, the image sensor data may be one or more images, which each include at least a portion of the transparent surface. In some implementations, the image sensor is a visible light image sensor, an IR image sensor, an NIR image sensor, or a UV image sensor. The image sensor may capture additional data such as depth data.

At block 720, the method 700 identifies a code in the image data, wherein the code is detectable on the transparent surface by the image sensor without interfering with a function of the electronic device involving the transparent surface. In some implementations, the code can be read without interfering with a user's view of a physical environment or an XR environment (e.g., content) through the transparent surface while using the HMD. In some implementations, the code can be read without interfering with eye tracking functionality implemented by the HMD while the transparent surface is attached. In some implementations, the code may be (1) markings on/in the transparent surface that are not visible to the human eye such as extremely small etchings on a portion of the transparent surface, (2) markings (e.g., fluorescent) that are detectable in an emission spectrum after being illuminated by a different excitation spectrum/illumination, (3) markings (e.g., photochromic) that are detectable in an illumination/detection spectrum after being illuminated by a different exposure spectrum/illumination, (4) markings (e.g., reflection holograms) that are detectable when illuminated in a single illumination/detection spectrum, or (5) markings (e.g., computational caustics) that are detected using a spaced apart projection surface.

At block 730, the method 700 provides content at the electronic device based on the identified code, wherein the content is viewable through the transparent surface. In some implementations, the content is provided or rendered based on an identified prescription in the identified code. In some implementations, providing the content may involve adapting the way the content is rendered based on the identified code. For example, providing the content based on the identified code may involve modifying a displayed image to compensate for lens distortion based on the prescription in the identified code (e.g., transparent surface). Alternatively, the identified code (e.g., prescription) is used for proper rendering, such as reducing or avoiding pupil swim, which is an artifact where a straight line can appear wobbly (e.g., when the user 115 turns their head). In another example, providing the content based on the identified code may validate the 3D position and orientation at which the transparent surface is attached within the HMD.

In some implementations, the method 700 detects the attachment (e.g., the act of attaching) of the transparent surface to the electronic device. In some implementations, detecting the attachment of the transparent surface to the electronic device is based on audio data, IMU data, verbal communications, proximity sensor, a vision sensor, an instruction, etc. For example, upon detecting the attachment of the transparent surface to the electronic device, the image data from the image sensor including the transparent surface is obtained to identify the code on the transparent surface.

In some implementations, the method 700 identifies the code for the transparent surface only once. For example, the code for the transparent surface is identified before use of the electronic device. Alternatively, the code for the transparent surface is identified during a blink of the eye of the user of the electronic device. In some implementations, the identified code for the transparent surface is repeatedly or periodically detected. For example, the identified code for the transparent surface is detected each time the electronic device is enabled.

In some implementations, blocks 710-730 are repeatedly performed. In some implementations, the techniques disclosed herein may be implemented on a smart phone, tablet, or a wearable device, such as an HMD having an optical see-through or opaque display.

A physical environment refers to a physical world that people can interact with and/or sense without the aid of electronic systems. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the electronic device presenting the XR environment is a single device that may be hand-held (e.g., mobile phone, a tablet, a laptop, etc.) or worn (e.g., a watch, a head-mounted device (HMD), etc.). In some implementations, functions of the electronic device are accomplished via two or more communicating (e.g., wired or wireless) devices, for example additionally including an optional base station. Other examples include a laptop, desktop, server, or other such device that includes additional capabilities in terms of power, CPU capabilities, GPU capabilities, storage capabilities, memory capabilities, and the like.

Figure 8:
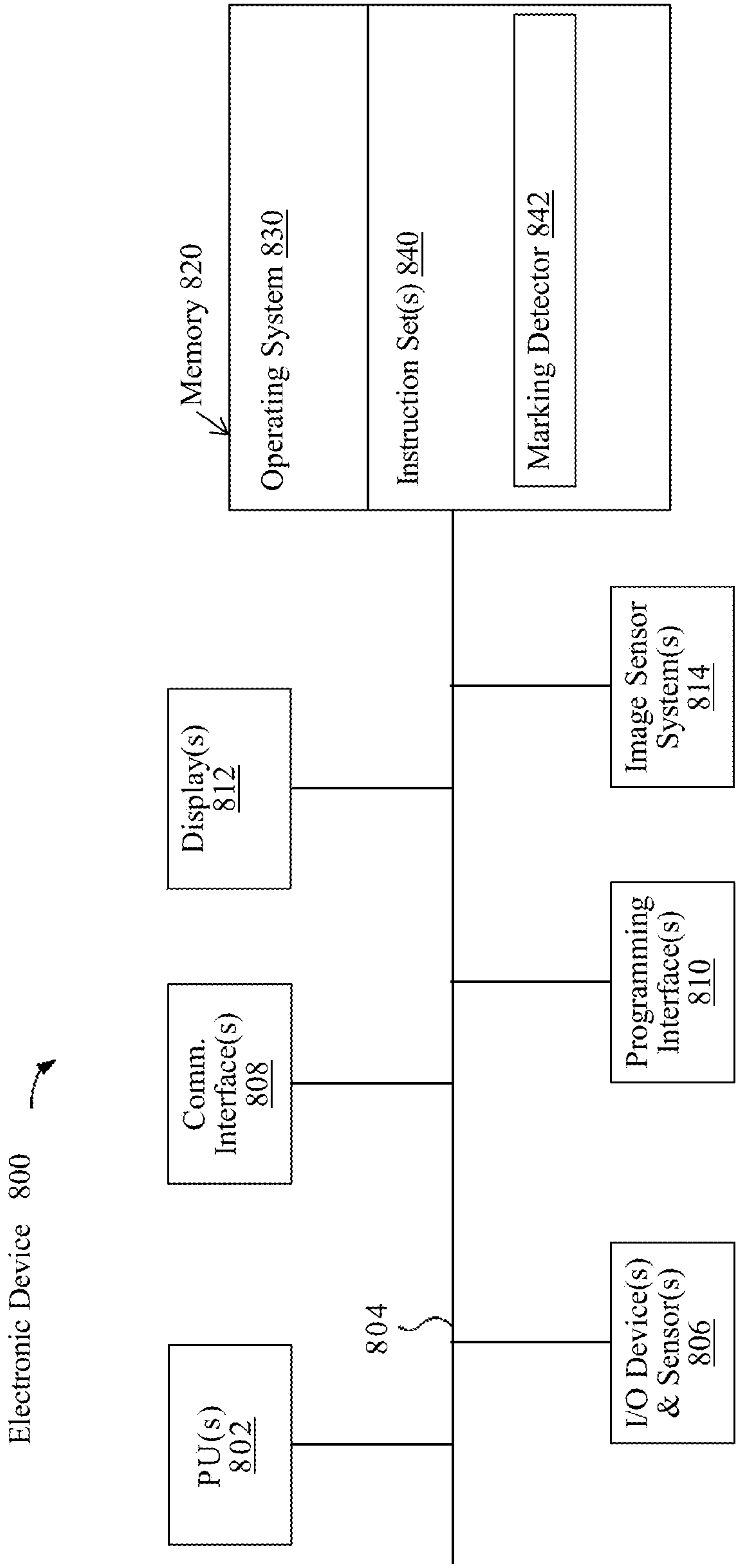
FIG. 8 illustrates an example electronic device in accordance with some implementations.

FIG. 8 is a block diagram of an example device 800. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 800 includes one or more processing units 802 (e.g., microprocessors, ASICs, FPGAs, GPUs, CPUs, processing cores, or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 810, one or more displays 812, one or more interior or exterior facing sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 812 are configured to present content to the user. In some implementations, the one or more displays 812 correspond to holographic, digital light processing (DLP), liquid-crystal display (LCD), liquid-crystal on silicon object (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 812 correspond to diffractive, reflective, polarized, holographic, etc. waveguide displays. For example, the electronic device 800 may include a single display. In another example, the electronic device 800 includes a display for each eye of the user.

In some implementations, the one or more interior or exterior facing sensor systems 814 include an image capture device or array that captures image data or an audio capture device or array (e.g., microphone) that captures audio data. The one or more image sensor systems 814 may include one or more RGB cameras (e.g., with a complimentary metal-oxide-semiconductor (CMOS) image sensor or a charge-coupled device (CCD) image sensor), monochrome cameras, IR cameras, or the like. In various implementations, the one or more image sensor systems 814 further include an illumination source that emits light such as a flash. In some implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

In some implementations, the instruction set(s) 840 include a marking detector 842 that is executable by the processing unit(s) 802 to detect markings on a transparent surface and identify information about the transparent surface using the detected markings according to one or more of the techniques disclosed herein. For example, the transparent surface may be a prescription lens insert for an HMD and the information may be prescription parameters of the prescription lens insert.

Although the instruction set(s) 840 are shown as residing on a single device, it should be understood that in other implementations, any combination of the elements may be located in separate computing devices. FIG. 8 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a processor:

- detecting an attachment of a transparent surface to an electronic device, wherein detecting the attachment comprises detecting that the transparent surface is mounted to the electronic device;
- based on detecting the attachment, obtaining image data from an image sensor of an electronic device, the image data corresponding to a transparent surface attached to the electronic device;
- detecting a blink of a user of the electronic device;
- obtaining one or more frames of data from the image sensor during the blink;
- identifying a code in the image data based on detecting the code on the transparent surface in the one or more frames of data from the image sensor, wherein the code is detectable on the transparent surface by the image sensor without interfering with a function of the electronic device involving the transparent surface; and
- providing content at the device based on the identified code, wherein the content is viewable through the transparent surface.

2. The method of claim 1, wherein the identified code identifies prescription parameters of the transparent surface, a user of the electronic device, or position and orientation of the transparent surface relative to the electronic device.

3. The method of claim 1, further comprising detecting the code based on detecting an act of attaching the transparent surface to the electronic device, wherein detecting the attachment is based on audio data, IMU data, verbal communications, proximity sensor, a vision sensor, or an instruction.

4. The method of claim 1, wherein the code comprises markings in the transparent surface that are not perceivable by an unaided human eye.

5. The method of claim 1, wherein the code comprises excitable fluorescent markings visible at a preset emission wavelength or wavelength band.

6. The method of claim 1, wherein the code comprises excitable photochromic markings viewable at a preset detection wavelength or wavelength band.

7. The method of claim 1, wherein the code comprises reflection holographic markings viewable from a limited angular range of positions.

8. The method of claim 1, wherein the code comprises computational caustic markings viewable at a preset detection wavelength or wavelength band on a projection surface spaced apart from the transparent surface.

9. The method of claim 1, wherein the detecting comprises detecting a transition of the transparent surface from an unmounted state to a mounted state.

10. A method comprising:

at a processor:

detecting an attachment of a transparent surface to an electronic device, wherein detecting the attachment comprises detecting that the transparent surface is mounted to the electronic device;

based on detecting the attachment, obtaining image data from an image sensor of an electronic device, the image data corresponding to a transparent surface attached to the electronic device;

identifying a code in the image data, wherein the code is detectable on the transparent surface by the image sensor without interfering with a function of the electronic device involving the transparent surface;

periodically detecting the code, wherein the code is generated using active illumination, when eye tracking or blink detection is not being performed by the electronic device or the electronic device is not in use, and providing content at the device based on the identified code, wherein the content is viewable through the transparent surface.

11. An electronic device comprising:

an image sensor configured to obtain image data corresponding to a transparent surface;

a display configured to present content at the electronic device for viewing; and a processor configured to perform operations comprising:

detecting an attachment of the transparent surface to the electronic device, wherein detecting the attachment comprises detecting that the transparent surface is mounted to the electronic device;

based on detecting the attachment, obtaining image data from an image sensor of an electronic device, the image data corresponding to the transparent surface attached to the electronic device;

detecting a blink of a user of the electronic device;

obtaining one or more frames of data from the image sensor during the blink;

identifying the code in the image data based on detecting the code on the transparent surface in the one or more frames of data from the image sensor, wherein the code is detectable on the transparent surface by the image sensor without interfering with a function of the electronic device involving the transparent surface; and providing the content at the electronic device based on the identified code, wherein the content is viewable through the transparent surface.

12. The electronic device of claim 11, wherein the code comprises markings in the transparent surface that are not perceivable by an unaided human eye.

13. The electronic device of claim 11, wherein the code comprises an excitable fluorescent material visible at a preset emission wavelength or wavelength band when the electronic device is not in use.

14. The electronic device of claim 11, wherein the code comprises excitable photochromic material that is viewable at a preset detection wavelength or wavelength band.

15. The electronic device of claim 11, wherein the code comprises a reflection holographic optical element viewable from a limited angular range of positions.

16. The electronic device of claim 11, wherein the code comprises a computational caustic and that is viewable at a preset detection wavelength or wavelength band on a projection surface spaced apart from the transparent surface.

17. The electronic device of claim 11, wherein the electronic device comprises a head-mounted device.

18. The electronic device of claim 11, further comprising tracking eyes or a gaze of a user of the electronic device using the image sensor.

19. The electronic device of claim 11, wherein the identified code identifies prescription parameters of the transparent surface, a user of the electronic device, or position and orientation of the transparent service relative to the electronic device.

20. A non-transitory computer-readable storage medium, storing program instructions executable via one or more processors to perform operations comprising:

detecting an attachment of a transparent surface to an electronic device, wherein detecting the attachment comprises detecting that the transparent surface is mounted to the electronic device;

based on detecting the attachment, obtaining image data from an image sensor of an electronic device, the image data corresponding to a transparent surface attached to the electronic device;

detecting a blink of a user of the electronic device;

obtaining one or more frames of data from the image sensor during the blink;

identifying a code in the image data based on detecting the code on the transparent surface in the one or more frames of data from the image sensor, wherein the code is detectable on the transparent surface by the image sensor without interfering with a function of the electronic device involving the transparent surface; and providing content at the device based on the identified code, wherein the content is viewable through the transparent surface.

* * * * *